United States Patent
Jiang et al.

(10) Patent No.: US 10,364,378 B2
(45) Date of Patent: Jul. 30, 2019

(54) POLARIZING STRUCTURE COMPRISING A GLYOXAL ADHESIVE SYSTEM AND POLARIZED LENS COMPRISING IT

(71) Applicant: ESSILOR INTERNATIONAL (COMPAGNIE GENERALE D'OPTIQUE), Charenton-le-Pont (FR)

(72) Inventors: Peiqi Jiang, Dallas, TX (US); Marvin Pounders, Dallas, TX (US)

(73) Assignee: ESSILOR INTERNATIONAL, Charenton-le-Pont (FR)

( * ) Notice: Subject to any disclaimer, the term of this patent is extended or adjusted under 35 U.S.C. 154(b) by 146 days.

(21) Appl. No.: 15/114,512

(22) PCT Filed: Jan. 8, 2015

(86) PCT No.: PCT/EP2015/050253
§ 371 (c)(1),
(2) Date: Jul. 27, 2016

(87) PCT Pub. No.: WO2015/113791
PCT Pub. Date: Aug. 6, 2015

(65) Prior Publication Data
US 2016/0340559 A1    Nov. 24, 2016

(30) Foreign Application Priority Data
Jan. 31, 2014    (EP) .................................... 14290018

(51) Int. Cl.
| | | |
|---|---|---|
| *C09J 129/04* | (2006.01) |
| *G02B 5/30* | (2006.01) |
| *G02B 1/14* | (2015.01) |
| *B32B 7/12* | (2006.01) |
| *B32B 27/06* | (2006.01) |
| *B32B 37/10* | (2006.01) |
| *B32B 37/12* | (2006.01) |
| *C09D 101/28* | (2006.01) |
| *C09J 11/06* | (2006.01) |
| *G02C 7/12* | (2006.01) |
| *C09J 7/35* | (2018.01) |
| *C09J 7/25* | (2018.01) |
| *G02B 1/04* | (2006.01) |

(52) U.S. Cl.
CPC .............. *C09J 129/04* (2013.01); *B32B 7/12* (2013.01); *B32B 27/06* (2013.01); *B32B 37/10* (2013.01); *B32B 37/12* (2013.01); *C09D 101/284* (2013.01); *C09J 7/25* (2018.01); *C09J 7/35* (2018.01); *C09J 11/06* (2013.01); *G02B 1/14* (2015.01); *G02B 5/3033* (2013.01); *G02C 7/12* (2013.01); *B32B 2307/42* (2013.01); *B32B 2551/00* (2013.01); *B32B 2551/08* (2013.01); *C09J 2433/001* (2013.01); *C09J 2469/001* (2013.01); *G02B 1/04* (2013.01)

(58) Field of Classification Search
CPC . C09J 129/04; C02B 1/14; B32B 7/12; B32B 27/06
See application file for complete search history.

(56) References Cited

U.S. PATENT DOCUMENTS

| | | | |
|---|---|---|---|
| 5,114,999 A | 5/1992 | Hui et al. ......................... 524/47 |
| 7,704,572 B2 | 4/2010 | Sugino et al. ................ 428/1.54 |
| 9,315,693 B2 * | 4/2016 | Jiang ................... B29D 11/0073 |
| 10,053,601 B2 * | 8/2018 | Jiang ................... B29D 11/0073 |
| 2006/0155061 A1 | 7/2006 | Liao et al. ........................ 525/58 |
| 2008/0113119 A1 | 5/2008 | Tsujiuchi et al. ............ 428/1.31 |
| 2008/0278810 A1 | 11/2008 | Kim et al. ................ 359/485.01 |
| 2009/0296024 A1 * | 12/2009 | Kanaya .................... B32B 27/30 349/64 |
| 2014/0034222 A1 * | 2/2014 | Jiang ................... B29D 11/0073 156/182 |

FOREIGN PATENT DOCUMENTS

| | | |
|---|---|---|
| EP | 1930750 | 6/2008 |
| JP | 2013 195494 | 9/2013 |
| KR | 2011 0075998 | 7/2011 |
| WO | WO 2004/059370 | 7/2004 |

OTHER PUBLICATIONS

Christian Hofmann, "Optical Materials," Ullmann's Encyclopedia of Industrial Chemistry, vol. 25, 465-483, published online 2000.*
Kim et al., "Effects of the Degree of Crosslinking on Properties of Poly(vinyl alcohol) Membranes", Polymer Journal, 25(12): 1295-1302, 1993.
International Search Report and Written Opinion issued in PCT/EP2015/050253, dated Apr. 21, 2015.

* cited by examiner

Primary Examiner — Nicholas E Hill
(74) Attorney, Agent, or Firm — Norton Rose Fulbright US LLP

(57) ABSTRACT

A polarizing structure comprising a polarizing film, a protective film provided on at least one face of the polarizing film with an adhesive layer which is a glyoxal-based adhesive or a water based polymer adhesive such as a PVOH-based adhesive layer, and wherein at least one face of said protective film oriented towards said polarizing film further comprises an adhesion primer structure. The adhesive avoids delamination of the polarizing structure, which withstands edging processing conditions, and which also show excellent dry peel force. Other aspects of the invention relates to a method for manufacturing such a polarizing structure, and a polarized ophthalmic lens comprising such polarizing structure.

9 Claims, No Drawings

POLARIZING STRUCTURE COMPRISING A GLYOXAL ADHESIVE SYSTEM AND POLARIZED LENS COMPRISING IT

CROSS-REFERENCE TO RELATED APPLICATIONS

This application is a national phase application under 35 U.S.C. § 371 of International Application No. PCT/EP2015/050253 filed 8 Jan. 2015, which claims priority to European Patent Application No. 14290018.2 filed 31 Jan. 2014. The entire contents of each of the above-referenced disclosures is specifically incorporated by reference herein without disclaimer.

BACKGROUND OF THE INVENTION

The invention relates to a polarizing structure comprising a glyoxal based adhesive system. It also relates to a polarized ophthalmic lens comprising such polarizing structure.

The optical or transmission properties of ophthalmic lenses can be modified by adding a film onto a lens surface. These films are often referred to as functional films such as polarizing films which are capable of reducing glare while providing a high level of optical transmission.

There are many ways to make polarized lenses, such as by injecting a lens against a polarizing film or structure, casting a lens adjacent a polarizing film or structure, casting a lens containing a polarizing film or structure, or laminating the film or structure with a glue. It is known to manufacture a polarized optical lens by laminating a polarizing structure onto a lens surface. Typically, an adhesive layer, for example thermal or UV curable glue, holt melt adhesives (HMA) or pressure sensitive adhesive (PSA) is placed between one surface of the optical lens and the polarizing structure, so as to permanently retain the structure on the surface of the optical lens. Such polarizing structure is obtained by incorporating a polarizing film, for example a polyvinyl alcohol (PVA) polarizer between two protective films. Materials for the protective layers can typically include cellulose triacetate (TAC), polycarbonate (PC), cellulose acetate butyrate (CAB), poly(methyl methacrylate) PMMA, poly(ethylene terephthalate) (PET) or polyamide (PA). The polarizing structure is laminated together with a water based adhesive between the protective films and the PVA film, such as a polyvinyl alcohol (PVOH) based adhesive. This adhesive can be sensitive to water; therefore, for example the TAC/PVA/TAC structure has very poor wet adhesion and can be easily separated when contacted with water.

Because of the water sensitivity of this polarizing structure and its poor wet adhesion, the polarized lens comprising such structure has delamination problems during wet wheel edging during processing of polarized lenses. More particularly, it has been seen that the TAC/PVA/TAC polarizing structure is separated at the edge of the lens due to the combined effects of wheel edging force with water during the edging process.

What's more, the dry peel force of said polarizing structure, i.e. the measurement of the force applied in order to peel off one of the films of said structure, is an important parameter to observe. Indeed, delamination problems are likely to be observed during dry edging or after repeated use of an ophthalmic lens comprising such a polarizing structure.

The adhesive system used in the polarizing structure is thus the key element in order to obtain a structure which maintains its integrity and does not delaminate.

According to the prior art, glyoxal is widely used as a film additive, for example to improve the properties of polyvinyl alcohol (PVA) films. In the Polymer Journal, Vol 25, No. 12, pp 1295-1302 (1993) article entitled *Effects of the Degree of Cross Linking on Properties of PVA Membranes*, the authors propose using glyoxal and glutaraldehyde as film additives.

U.S. Pat. No. 5,114,999 discloses using glyoxal as a binder insolubilizer in a paper coating composition.

Glyoxal is also used as a crosslinking agent in adhesive formulations, for example, as a crosslinking agent for polyvinyl alcohol (PVOH) adhesive used in PVA and cellulose triacetate (TAC) film lamination. Glyoxal is a well known crosslinking agent within the PVA film industry to improve water resistance.

However, there has not been a suggestion to use it as an adhesive to bond PVA polarizing film and TAC film. Further more, in the prior art like U.S. Pat. No. 7,704,572, glyoxal is always used as an additive, for example as that is a cross-linking agent used in a minor quantity in an adhesive where the adhesive which represents the main compound component of the formulation. Other approaches suggest using metal crosslinking materials (U.S. Published Patent Application 2008/0278810) and other crosslinking agents such as glyoxal (U.S. Published Patent Application 2006/0155061) in PVOH adhesive to improve the film's water resistance. However, tests using these proposed adhesives failed to achieve the minimum requirements for adhesion. Therefore an adhesion problem arises that needs a solution.

In all of the prior approaches, glyoxal was used as a film additive or crosslinking agent and not as the main adhesive component.

SUMMARY OF THE INVENTION

There is a need to provide a new polarizing structure which is moisture resistant in order to withstand dry or wet edging processing conditions, and which also show excellent dry peel force.

Therefore, it is an object of the invention to provide a new polarizing layered structure comprising a glyoxal-based adhesive or a water based polymer adhesive such as a PVOH-based adhesive or a system that can be manufactured simply and is compatible with any method for making polarized lenses, such as lamination, casting or film injection molding.

Moreover, the object of the present invention is to be able to provide a wide variety of new polarizing structures, which can be symmetrical or asymmetrical, i.e. with the same protective layers on both side of the polarizing film, or with only one protective layer on one side of the polarizing film or different protective layers on both sides of the polarizing film.

It is therefore an aim to provide a strong adhesive system between the films within the polarizing structure which delivers excellent performance during the edging process, as well as an excellent dry peel force. In particular the adhesive system can be different on both side of the polarizing film, in particular in the case where the polarizing structure is asymmetrical, i.e. has only one protective layer on one side of the polarizing film or different protective layers on both side of the polarizing film.

It is a further object according to another embodiment of the invention to provide a method for manufacturing such a polarizing structure.

It is yet another object to provide a polarized ophthalmic lens which includes said polarizing structure.

The objects of the invention are achieved involving as adhesive system, either a specific mono-layered adhesive, or a specific multi-layered adhesive system comprising the combination of an adhesion primer structure and of a specific adhesive layer, said adhesive layer being chosen as a glyoxal-based adhesive or a water based polymer adhesive such as a PVOH-based adhesive, provided that at least one multi-layered adhesive system is involved in the polarizing structure of the invention.

This inventive adhesive system is based on a selection of a specific adhesive system which can be adapted to the choice of the protective layers, in order to solve the above-cited technical problems and gives unexpected and good results.

Thus the polarizing structure of the invention comprises a polarizing film and a protective film provided on at least one face of the polarizing film with an adhesive layer, wherein said adhesive layer is a glyoxal-based adhesive or a water based polymer adhesive such as a PVOH-based adhesive, and wherein at least one face of said protective film oriented towards said polarizing film further comprises an adhesion primer structure.

In particular, said adhesive layer should have both good bonding to said polarizing film and to said primer adhesive structure. The primer adhesive layer should only have good adhesion to said protective films.

According to a preferred embodiment of the invention, when the protective film is PC or PMMA, then said multi-layered adhesive system is involved. For other protective layers, in particular TAC, then preferably a mono-layered glyoxal-based adhesive is involved.

The water based polymer adhesive layer used in the polarizing structure of the invention includes a water based polymer solution, such as PVOH-based water solution, containing between about 5% and about 50% by weight PVOH.

The glyoxal-based layer used in the polarizing structure of the invention includes a glyoxal water solution containing between about 5% and about 50% by weight glyoxal and adjusted to a pH below about 7.

The adhesive layer of the invention are obtained from an aqueous solution comprising glyoxal or a water-based polymer, said solution being applied on a support and then cured in order to obtain the layer.

The adhesion primer structure refers to a mono- or multi-layered structure comprising a single layer of an adhesion primer, for example a hot melt adhesive layer or a latex adhesive layer or several successive layers of adhesion primer, for example a bi-layered structure comprising a hot melt adhesive layer and a latex adhesive layer or a tri-layered structure comprising a hot melt adhesive layer sandwiched between two latex layers.

The polarizing film is preferably a light-polarizing polyvinyl alcohol-based layer (PVA).

According to a preferred embodiment of the invention, the polarizing film is sandwiched between two protective films. Materials of the protective films may be identical or different, for example, selected from the group consisting of polycellulosics, polycarbonates, polyesters, poly(meth) acrylics, polycyclic olefin copolymers, polyolefinics, thermal plastic polyurethanes, polythiourethanes, polyvinyls, polystyrenes, polyamides, polyimides, polysulfones, polyether sulfones, poly ether ether ketones, polyphenylene sulfides, polyoxymethylenes, polyurethanes, epoxys or blend therof, triacetyl cellulose-base layers (TAC), polycarbonate layers (PC), poly(ethylene terephthalate) (PET), poly (methyl methacrylate) PMMA, polystyrene (PS), and cellulose acetate butyrate (CAB).

The second object of the invention involves a method for manufacturing a polarizing structure. A polarizing film and at least one protective film preferably two protective films are provided. For the production of a polarizing structure, a mono-layered adhesive, or a multi-layered adhesive system is deposed between the polarizing film and the protective films. The adhesive can also be applied either onto one face of the polarizing film or one face of the protective film by roll coating or by rod coating or both. The protective films are pressed against the polarizing film to form a polarizing structure. The layered structure is cured at a temperature between 50° C.-110° C. for about 0.1-3 hours.

Prior to the deposing step, if necessary, the protective film is surface treated with at least a caustic treatment so as to improve the adhesion. Plasma, corona, chemical surface modification, ultraviolet treatment or any combination may be used.

Another benefit of the adhesive of the present invention is that it can be easily manufactured in an in-line lamination process well known from the skilled person, and can be easily adaptable for each different type of polarizing structure to be obtained.

The third object of the invention involves a polarized optical element having a polarizing structure of the present invention adhered directly to an optical base element to form a polarized optical element. Such polarizing structure may be present on the front face or on the rear face of such optical element. The optical element may include an adhesive layered structure disposed between the base element and the polarizing structure so as to permanently retain the polarizing structure on the base element. Such adhesive structure may include a bi-layer or a tri-layer adhesive structure which comprises at least a layer of hot melt adhesive and a layer of latex, or a pressure sensitive adhesive layer. For the purpose of the invention, the expression "optical base element" is understood to mean optical lenses, lenses for optical instruments, optical filters, windows, visors, mirrors and displays, preferably optical lenses, more preferably ophthalmic lenses. "Ophthalmic lenses" are defined as lenses adapted namely for mounting in eyeglasses whose function is to protect the eye and/or to correct vision; these lenses are selected from the afocal, unifocal, bifocal, trifocal, and progressive lenses. The bonding of the polarizing structure occurs independently of the manufacturing of the optical base element and of its thermosetting or thermoplastic nature. The optical base element is made of a material classically used in optics. By way of information but not limitation, the materials are chosen from among the polycarbonates; polyamides; polyimides; polysulfones; copolymers of polyethylene there phthalate and polycarbonate; polyolefins, namely polynorbornenes; polymers and copolymers of diethylene glycol bis(allylcarbonate); (meth) acrylic polymers and copolymers, namely (meth)acrylic polymers and copolymers derived from bisphenol-A; thio (meth)acrylic polymers and copolymers; urethane and thiourethane polymers and copolymers; epoxy polymers and copolymers; and episulfide polymers and copolymers.

Advantageous, at least one functional coating may give the optical element additional functions. Such coatings may in fact be placed easily on the protective film, given that the latter is made of a chemically inert material.

Said functional coating includes but not limited to a function protecting against photodegradation or photo-oxidation, an anti-shock function, an anti-radiation function, an anti-reflection function, a color filtration function, a photochromic function, an antistatic function, an anti-contamination function.

Additionally, the polarized lenses may also be made by lamination, in-mold lamination, injection molding, or casting to permanently secure the polarizing structure to an optical base lens.

DETAILED DESCRIPTION OF THE PREFERRED EMBODIMENTS

In this application the following definitions apply to the various words mentioned.

Film refers to single layer of material, for example a TAC film or a PVA film.

Polarizing structure refers to a layered structure comprising a polarizing film, for example based on PVA or PET having, at least on one of its surfaces, a protective film. The ensemble performs a polarizing function. In the rest of the description, said layered structure is so called a polarizing structure.

The hot melt adhesive layer includes one or more of a UV curable HMA, a UV curable monomer, a thermal curable HMA, and a thermal curable monomer, a polymer HMA, a thermoplastic polymer HMA. In a preferred embodiment, the HMA is a heat-activable polyurethane adhesive. The HMA layer comprises a dry, solid layer between 1.0 microns and 20 microns with a uniform thickness throughout to provide optical quality. In a preferred embodiment the HMA layer is between 1 microns and 15 microns, more preferably between 3 microns and 8 microns, with a uniform thickness varying by less than 0.5 microns throughout to provide optical quality.

HMA materials meeting such requirements that may be used in the invention include polyurethane based heat-activatable adhesive materials. These materials are characterized as aqueous anionic dispersions of high molecular weight polyurethane. One type that kind of HMA is commercially available from Bayer are referred to as Dispercoll® U 42 and KA-8758. Bond Polymers International LLC commercialized also two waterborne polyurethane dispersions which are usable in the present invention: Bondthane® UD-104 and Bondthane® UD-108. The HMA materials may optionally be blended with additives to adjust the rheological, mechanical or optical properties thereof. For example, additives, such as water or colloid silica or surfactant, can be added to the HMA formulation to facilitate crosslinking to improve the hardness and durability. A suitable colloid could be LUDOX® SM-30 colloidal silica, 30 wt. % suspension in H2O. The percentage of colloid in HMA could be in the range of 1-20 wt % and with a preferred range of 2-10 wt %. The HMA materials in this invention can also be any known polymer for formulating a hot melt adhesive, but is preferably a thermoplastic polymer. Thus, HMA polymer can be chosen amongst polyolefins, polyamides, polyurethanes, polyurethane/ureas, polyvinypyrrolidones, polyesters, polyesteramides, poly(oxazolines) and poly(meth)acrylic systems. Suitable polyolefines are disclosed in particular U.S. Pat. No. 5,128,388. Preferred polyolefines are block thermoplastic elastomers such as block elastomers comprising polystyrene blocks, polybutadiene blocks, polyisoprene blocks or ethylene-butylene copolymer blocks.

The latex adhesive layer comprises a material selected from the group consisting of an acrylic latex, a (meth)acrylic latex, a polyurethane latex, a core/shell latex, and combinations thereof. The latex layer comprises a dry, solid layer of between 0.5 microns and 10 microns thick with a uniform thickness throughout to provide optical quality. In a preferred embodiment the latex layer is between 1.0 microns and 5.0 microns thick with a uniform thickness varying by less than 0.5 microns throughout to provide optical quality.

Latex materials meeting such requirements that may be used in the invention include polyurethane latex, acrylic latex, and core/shell latex. For example, (meth)acrylic such as acrylic latexes commercialized under the name Acrylic latex A-639 by Zeneca, polyurethane latexes such as the latexes commercialized under the names W-213, W-240 and W-234 by Baxenden, or a polyurethane latex based on this commercialized product. Preferably, polyurethane latexes are utilized in the practice of the invention and more particularly such latexes as described in U.S. Pat. No. 5,316,791. Other preferred latexes are core/shell latexes such as those described in U.S. Pat. Nos. 6,503,631 and 6,489,028. Other preferred latexes are alkyl(meth)acrylates such as butylacrylate or butyl(meth) acrylate.

The latex materials may optionally be blended with additives to adjust the rheological, mechanical or optical properties thereof. For example, a coupling agent may be added to the latex material to promote adhesion to the functionalized layered support as described in U.S. Pat. No. 6,562,466. The latex material may include a cosmetic or photochromic dye or color dye or functional materials, such as anti-static materials, for example, as described in EP 1161512, U.S. Pat. Nos. 6,770,710 and 6,740,699.

As mentioned hereinbefore, in place of latex, it is possible to use as adhesive a specific silane derivative which is represented by gamma aminopropyltriethoxysilane. This compound is notably commercialized by Momentive Performance Material under the name Silquest A-1100. In the present invention, A-1100 solution was made by adding 6.25% of A-1100 by volume to deionized water, such solution being spin-coated on the functionalized layer.

The adhesion primer structure refers to a mono- or multi-layered structure comprising a single layer of an adhesion primer, for example a hot melt adhesive layer or a latex adhesive layer or several successive layers of adhesion primer, for example a bi-layered structure comprising a hot melt adhesive layer and a latex adhesive layer or a tri-layered structure comprising a hot melt adhesive layer sandwiched between two latex layers.

PVA refers to a polarized polyvinyl alcohol film, which is a single film layer.

PVOH refers to a polyvinyl alcohol, that is a solid dissolved in a liquid that and is used as a component in an adhesive system.

SF means a semi-finished lens, that is a lens with one optical surface and another surface side that needs to be ground to the wearer's optical power.

Rx means a prescription for an ophthalmic lens.

Wheel edging or wet wheel edging means mechanical shaping of the perimeter of an optical article using a grinding wheel typical in the optical industry without or with water.

There is a need in the optical industry to manufacture polarized lenses. While they provide protection from the sun as do fixed tint lenses, they add an extra feature of reducing or eliminating glare which provides more comfort and safety to the wearer. Polarized optical articles typically contain a polarizing medium such as a polarizing film which may be manufactured from PVA (U.S. Pat. No. 2,237,567), which is well known in the industry.

In other cases where more durability is desired, the polarizing structure may also include two protective films, which are positioned one on each side of the polarizing film. U.S. Published Patent Application 2010/0202049 describes a polarizing structure where a PVA polarizing film is sandwiched in-between cellulose triacetate (TAC). This polarizing structure is referred to as a wafer or a polarizing plate as described in U.S. Published Patent Application 2008/0278810. The adhesive used in this case is an aqueous based solution consisting of a PVA material (Dp~2000, 94% hydrolyzed) containing acetacetyl groups (5%), zirconium amine compound (AC-7) with the pH controlled to ~8.5 by 1M HCl. An epoxy resin adhesive is described in U.S. Published Patent Application 2010/0110542. The PVA can also contain useful molecules such as melanin as described in U.S. Pat. No. 7,029,758. Other protective films may be but not limited to films, including those described in U.S. Appl. 20100157195, of transparent polymers such as cellulose based polymers such as diacetylcellulose and triacetyl cellulose (TAC), cellulose acetate butyrate (CAB); polycarbonate (PC) based polymer; polyamide (PA); polyester based polymers such as polyethyleneterephthalate (PET), polyethyleneterephthalate glycol (PETG) and polyethylene naphthanate; acrylate based polymers such as polymethacrylate (PMA); methacrylate polymers such as polymethyl methacrylate (PMMA); thermoplastic urethane polymers (TPU); polythiourethane based polymers; vinyl based polymers such polyvinyl chloride, polyvinyl alcohol, polyvinylidene chloride, polyvinyl butyral; styrene based polymers such as polystyrene, styrene methylmethacrylate copolymers (SMMA), styrene maleic anhydride polymers (SMA), acrylonitrile-styrene (ANS) copolymers, acrylonitrile butadiene styrene (ABS) terpolymers, (meth)acrylate butadiene styrene (MBS) terpolymers; olefin based polymers such as polyethylene, polypropylene, polymethylpentene (PMP), cyclic (COC) or norbornene structure-containing polyolefins, and ethylene-propylene copolymers; amide based polymers such as nylon and aromatic polyamide; imide based polymers; polyether imide based polymers; polysulfone based polymers; polyether sulfone based polymers; polyether ether ketone based polymers; polyphenylene sulfide based polymers; polyoxymethylene based polymers; and epoxy based polymers, or any blend thereof.

When using water based adhesives to assemble a polarizing structure, it is important that the structure remains intact during all stages of processing. This includes the manufacturing process of the structure itself, the manufacturing process that provides a polarizing lens and the process that allows the lens to be a useful ophthalmic product for the wearer. During the processing of the polarizing lens, it is common to surface/grind and polish the lens to a specific optical power. This process typically involves exposure of the polarizing lens to water. The process of edging or shaping the lens to fit into a frame can also expose the polarizing lens to water. It is very important that the polarizing structure remains intact and that no separation occurs between its layers. It is also very important that the polarizing structure does not delaminate after subsequent and repeated use of a product incorporating it, such as an ophthalmic lens, under dry edging process conditions.

It also has to be taken into consideration that the different protective layers have completely different surface characteristics when compared to each other, as well as compared with the surface characteristics of the polarizing film. Therefore an aim of the present invention is to find a polarizing structure which will provide satisfying adhesive properties between each of its films, in particular when the polarizing structure is asymmetrical, for example PC/PVA/TAC or PMMA/PVA/TAC.

The first object of present invention concerns a polarizing structure comprising:

a polarizing film;
a protective film provided on at least one face of the polarizing film with an adhesive layer,
wherein said adhesive layer is a glyoxal-based adhesive or a water based polymer adhesive, preferably a PVOH-based adhesive layer, and wherein at least one face of said protective film oriented towards said polarizing film further comprises an adhesion primer structure.

In one embodiment of the invention, the polarizing structure includes one single protective film, this latter is placed on the opposite side of the polarizing film from the lens. In a preferred embodiment of the invention, the polarizing structure may also include two protective films. This results in better protection of the polarizing film.

The polarizing film of the invention is defined as is a light-polarizing polyvinyl alcohol-based layer (PVA), and each of said protective films are independently selected from the group consisting of polycellulosics, polycarbonates, polyesters, poly(meth)acrylics, polycyclic olefin copolymers, polyolefinics, thermal plastic polyurethanes, polythiourethanes, polyvinyls, polystyrenes, polyamides, polyimides, polysulfones, polyether sulfones, poly ether ether ketones, polyphenylene sulfides, polyoxymethylenes, polyurethanes, epoxys or blend therof.

Preferably the polarizing film is a light-polarizing polyvinyl alcohol-based layer (PVA), and each of said protective films are independently selected from the group consisting of triacetyl cellulose-base layers (TAC), polycarbonate layers (PC), poly(ethylene terephthalate) (PET), poly(methyl methacrylate) PMMA, polystyrene (PS), polyamide (PA) and cellulose acetate butyrate (CAB).

According to the invention, the water based polymer adhesive layer used in the polarizing structure of the invention is obtained from a water based polymer adhesive solution comprising between about 5% and about 50% by weight of polymer. Preferably, said water based polymer is PVOH.

According to the invention, the glyoxal-based adhesive layer is obtained from a glyoxal water solution comprising between about 5% and about 50% by weight glyoxal and adjusted to a pH below about 7.

The present invention also includes, as included in the definition of the glyoxal-based adhesive layer, a glyoxal-PVOH-based adhesive layer, which is water-based adhesive layer comprising a mixture of PVOH-based and glyoxal-based adhesive layer.

Preferably, the glyoxal water solution comprises:
between about 5% and about 50% by weight of glyoxal,
less than 1% by weight of a pH adjusting compound; and
the remainder water.

In one embodiment, said pH adjusting compound comprises hydrochloric acid (HCl) and the optical adhesive product is adjusted to a pH below about 6.

In a variant of the invention, said glyoxal-based adhesive layer further comprises a water based polymer that is present in an amount less than or equal to the amount of glyoxal.

Thus in another embodiment of the invention, said glyoxal water solution comprises:
between about 3% and 40% by weight of glyoxal,
between 2% and 6% by weight of polyvinyl alcohol (PVOH) polymer,
less than 1% by weight of a pH adjusting compound; and
the remainder water.

In a preferred variant of this embodiment, said glyoxal water solution comprises:
between 5% and 10% by weight of glyoxal, and
between 3% and 6% by weight of PVOH.

In another preferred variant of this embodiment, said glyoxal water solution comprises:
about 5% by weight of glyoxal, and
about 5% by weight of PVOH.

According to the invention, the water based polymer is selected from the group consisting of water based polymers containing OH groups in the structure such as polyvinyl alcohol (PVOH), polyurethanes (PU) containing hydroxy groups, hydroxyethyl cellulose, hydroxypropyl cellulose, sodium carboxymethyl cellulose, and agarose.

According to the invention, said adhesion primer structure is a mono- or multi-layered structure selected from the group consisting of a hot melt adhesive layer, a latex adhesive layer and mixtures thereof.

In a preferred variant of the polarizing structure of the invention, when said protective film is chosen from PC and PMMA, then the adhesive layer further comprises the adhesion primer structure. In another variant, when said protective film is TAC, then the adhesive layer does not need to further comprise the adhesion primer structure.

In another preferred variant, the polarizing structure of the invention comprises two protective films, at least one of them being chosen from PC or PMMA, wherein the adhesive layer is a glyoxal-based adhesive, and said PC or PMMA protective film further comprises on its face oriented towards the polarizing film, an adhesion primer structure.

In still another preferred variant when the polarizing structure of the invention comprises two protective films, one being chosen from PC and PMMA, and the other being TAC, then the adhesive layer on PC or PMMA further comprises the adhesion primer structure, and the adhesive layer on TAC does not further comprise the adhesion primer structure.

Preferably in those preferred variants, said glyoxal-based adhesive is obtained from a glyoxal water solution comprising:
between about 3% and 40% by weight of glyoxal,
between 2% and 6% by weight of polyvinyl alcohol (PVOH) polymer,
less than 1% by weight of a pH adjusting compound; and
the remainder water.

More preferably in those preferred variants, said glyoxal-based adhesive is obtained from a glyoxal water solution comprising:
about 5% by weight of glyoxal, and
about 5% by weight of PVOH.

The second object of present invention concerns a method for manufacturing a polarizing structure according to the first aspect of the invention, which comprises the following steps:
providing a polarizing film;
providing a protective film on at least one face of the polarizing film;
depositing an adhesion primer structure on at least one face of said protective film oriented towards said polarizing film;
depositing a water based polymer adhesive solution, preferably a PVOH-based adhesive solution, or a glyoxal-based adhesive solution between said polarizing film and said protective film;
pressing the protective film against the polarizing film to form a polarizing structure; and
curing the assembly at a temperature between 60° C.-100° C. for 5-30 min.

In one embodiment, prior to the step of depositing a water based polymer adhesive solution or a glyoxal-based adhesive solution, the method further includes a step of surface treating of the protective film with at least a caustic treatment or washing step.

Preferably in the method of the invention, the step of deposing a water based polymer adhesive solution or a glyoxal-based adhesive solution comprises rod coating or roll coating the adhesive layer either onto one face of the polarizing film or one face of the protective film, or one face of the polarizing film and one face of the protective film.

The third object of present invention concerns a polarized optical element comprising an optical base element and a polarizing structure comprising:
a polarizing film;
a protective film provided on at least one face of the polarizing film with an adhesive layer,
wherein said adhesive layer is a glyoxal-based adhesive or a water based polymer adhesive, preferably a PVOH-based adhesive, and wherein at least one face of said protective film oriented towards said polarizing film further comprises an adhesion primer structure.

Each technical characteristics described above concerning the polarized structure of the invention shall apply individually or in combination regarding the polarized optical element of the invention.

The polarized optical element of the invention may be selected from the group consisting of optical lenses, lenses for optical instruments, optical filters, windows, visors, mirrors and displays, preferably optical lenses, more preferably ophthalmic lenses.

According to the invention, said optical element can be made by lamination, in-mold lamination, injection molding or casting.

In a preferred embodiment, the optical element of the invention further includes at least one functional coating placed on the protective film on the opposite side of said protective film from the polarizing film, said coating selected from the group consisting of hard coating, anti-reflective coating, photochromic coating, tinted coating, anti-fog coating and anti-smudge coating.

Some examples of the invention as well as comparative examples are given below for illustrative purpose, and do not limit the scope of the invention.

EXAMPLES

Example 1 a) Manufacturing a PC/PVA/TAC Polarizing Structure

A commercial PC film (Lot no. 8010 112 SC) from Sabic Polymershapes Inc was hand washed by soap and water and pre-coated with UD 104 solution from Bond Polymer International Inc on one side by Rod coater and then dried at 60° C. during 1 hour. The dried coating thickness of UD 104 was about 3 µm. Then, this HMA coated PC film was laminated with PVA and TAC film via Glyoxal-PVOH adhesive solution comprising 5% of Glyoxal, 5% of PVOH/Z320 and 0.52% HCl. The resulting structure is then cured in the temperature conditions of 60-100° C. during 5-30 min, to obtain the final PC/PVA/TAC polarizing structure.

b) Measurement of the Dry Peel Force

The dry peel force value is measured during a peel test with a Mark 10 equipment, in the following conditions:
Anhydrous environment,
The film width is 25 mm,
PC Film was separated from the PVA-TAC film interface at 180° T-peel with a peel speed of 1.5 mm/min.

A skilled person would consider that the value of the dry peel force is sufficient, i.e. the film does not delaminate from its support, when the value is above 10 N.

The obtained PC-PVA-TAC film has a dry peel force value of above 19 N between PC and PVA, consequently it is considered that the PC film has a very good adhesion on the PVA film.

Example 2

Same as Ex. 1 except a HMC coated PC film, i.e. a film coated successively with a hardcoat, a anti-reflective coating, and a top coat, was used on both sides for lamination with the PVA film via same adhesive as Example 1. The obtained PC-PVA-PC showed same good adhesion as Example 1.

Comparative Example 1

Example 1 was repeated with no HMA coating on PC film. The obtained PC-PVA-TAC film had very poor adhesion between PC and PVA. The PC film could be peeled off easily by hand. The peel force value was under 2N.

Comparative Example 2

Example 2 was repeated with no HMA coating on PC film. The obtained PC-PVA-PC film had very poor adhesion between PC and PVA. The PC film could be peeled off easily by hand. The peel force value was under 2 N.

Comparative Example 3

Example two was repeated except the water based Glyoxal-PVOH adhesive was replaced by a UD-104 solution. The obtained PC-PVA-PC film had very poor adhesion between PC and PVA. The PC film could be peeled off easily by hands. The peel force value was under 2 N.

Comparative Example 4

Example two was repeated except NO water based Glyoxal-PVOH adhesive was used. The obtained PC-PVA-PC film had very poor adhesion between PC and PVA. The PC film could be peeled off easily by hands. The peel force value was under 2 N.

The results of the different samples studied are summarized in the Table 1 below:

TABLE 1

| Samples | HMA Coating on PC | Adhesive type | Polarizing film type | Peel force |
|---|---|---|---|---|
| Example 1 | UD-104 | Glyoxal-PVOH | PC-PVA-TAC | >19 N |
| Example 2 | UD-104 | Glyoxal-PVOH | PC-PVA-PC | >19 N |
| Comparative 1 | No | Glyoxal-PVOH | PC-PVA-TAC | <2 N |
| Comparative 2 | No | Glyoxal-PVOH | PC-PVA-PC | <2 N |
| Comparative 3 | UD-104 | UD-104 | PC-PVA-PC | <2 N |
| Comparative 4 | UD-104 | No | PC-PVA-PC | <2 N |

The invention claimed is:

1. A polarizing structure comprising:
a polarizing film having faces; and
a protective film provided on both faces of the polarizing film with an adhesive layer;
wherein the adhesive layer is a glyoxal-based adhesive obtained from a glyoxal water solution comprising:
about 5% by weight of glyoxal; and
about 5% by weight of polyvinyl alcohol (PVOH) polymer
at least one of the protective films comprises PC or PMMA; and
wherein a first face of the at least one protective film is oriented towards the polarizing film and further comprises an adhesion primer structure.

2. The polarizing structure of claim 1, wherein the polarizing film is a light-polarizing polyvinyl alcohol-based layer (PVA), and the second protective film comprises at least one polycellulosic, polycarbonate, polyester, poly(meth)acrylic, polycyclic olefin copolymer, polyolefinic, thermal plastic polyurethane, polythiourethane, polyvinyl, polystyrene, polyamide, polyimide, polysulfone, polyether sulfone, poly ether ether ketone, polyphenylene sulfide, polyoxymethylene, polyurethane, and/or epoxy.

3. The polarizing structure of claim 1, wherein the polarizing film is a light-polarizing polyvinyl alcohol-based layer (PVA), and the second protective film comprises one triacetyl cellulose-base layer (TAC), polycarbonate layer (PC), poly(ethylene terephthalate) (PET), poly(methyl methacrylate) PMMA, polystyrene (PS), polyamide (PA), and/or cellulose acetate butyrate (CAB).

4. The polarizing structure of claim 1, wherein the adhesion primer structure is a mono- or multi-layered structure further defined as comprising a hot melt adhesive layer and/or a latex adhesive layer.

5. The polarizing structure of claim 1, which comprises one protective film chosen from PC or PMMA, and one TAC protective film.

6. A method for manufacturing a polarizing structure of claim 1, comprising the following steps:
providing a polarizing film;
providing a protective film on at least one face of the polarizing film;
deposing an adhesion primer structure on at least one face of the protective film oriented towards the polarizing film;
deposing a water based polymer adhesive solution, or a glyoxal-based adhesive solution between the polarizing film and the protective film;
pressing the protective film against the polarizing film to form a polarizing structure; and
curing the assembly at a temperature between 60° C.-100° C. for 5-30 min.

7. The method of claim 6, wherein the water based polymer adhesive solution is a PVOH-based adhesive solution.

8. The method of claim 6, wherein prior to deposing a water based polymer adhesive solution or a glyoxal-based adhesive solution, the method further includes a step of surface treating of the protective film with at least a caustic treatment or washing.

9. The method of claim 6, wherein deposing a water based polymer adhesive solution or a glyoxal-based adhesive solution comprises rod coating or roll coating the adhesive layer either onto one face of the polarizing film or one face of the protective film, or one face of the polarizing film and one face of the protective film.

* * * * *